United States Patent [19]

Corbett

[11] 4,299,519
[45] Nov. 10, 1981

[54] TWO PIECE FASTENER AND INSTALLATION TOOL

[75] Inventor: Robert J. Corbett, Saugerties, N.Y.

[73] Assignee: Huck Manufacturing Company, Irvine, Calif.

[21] Appl. No.: 144,846

[22] Filed: Apr. 29, 1980

Related U.S. Application Data

[63] Continuation of Ser. No. 2,582, Jan. 10, 1979, abandoned.

[51] Int. Cl.³ .................. F16B 19/05; B21J 15/00
[52] U.S. Cl. .............................. 411/361; 72/391
[58] Field of Search ............... 72/391; 411/361, 355, 411/356, 38; 29/243.53, 243.54

[56] References Cited

U.S. PATENT DOCUMENTS

| | | | |
|---|---|---|---|
| 1,629,925 | 5/1927 | Moore | 411/355 |
| 2,167,558 | 7/1939 | Upson | 411/411 |
| 2,542,237 | 2/1951 | Torresen | 72/391 |
| 2,562,019 | 7/1951 | Colley | 411/38 |
| 2,972,274 | 2/1961 | La Bombard | 411/337 |
| 3,007,364 | 11/1961 | Dickie | 411/15 |
| 3,029,665 | 4/1962 | Baugh | 72/402 |
| 3,180,126 | 4/1965 | Carlson | 72/365 |
| 3,197,987 | 8/1965 | Martin | 72/114 |
| 3,241,421 | 3/1966 | Siebol | 411/361 |
| 3,266,364 | 8/1966 | Becker | 411/44 |
| 3,378,054 | 4/1968 | Vaughn | 411/106 |
| 3,645,125 | 2/1972 | Summerlin | 72/391 |
| 3,792,933 | 2/1974 | Stencel | 72/391 |
| 3,915,053 | 10/1975 | Ruhl | 411/361 |
| 4,010,630 | 3/1977 | Davis | 72/391 |

FOREIGN PATENT DOCUMENTS 657135  2/1963  Canada .................. 411/361

Primary Examiner—Gene P. Crosby
Attorney, Agent, or Firm—Harness, Dickey & Pierce

[57] ABSTRACT

A two piece pull-type fastener is disclosed herein comprising a pin and collar adapted to be swaged into locking engagement with the pin upon setting of the fastener by application of a pulling force to the pin and reaction force on the collar. The pin is provided with a minimum number of pull grooves defined by alternating crests and valleys which grooves are sufficient in strength to allow an installation tool to exert a pulling force on the pin of a magnitude required to properly set the fastener. The installation tool has a gripping structure adapted to engage the pull grooves. The gripping structure and pull grooves are complementarily shaped so as to prevent engagement of less than all of the pull grooves by the gripping structure of the tool in order to prevent stripping of the pull grooves if less than all are attempted to be engaged. Thus an installation tool nose assembly is also disclosed which nose assembly is uniquely designed for use with the present fastener. In a preferred form of the invention, the pull grooves of the fastener are provided on a pintail portion of the fastener. In a different form of the invention the pull grooves are located within an opening in the end portion of the pin.

32 Claims, 6 Drawing Figures

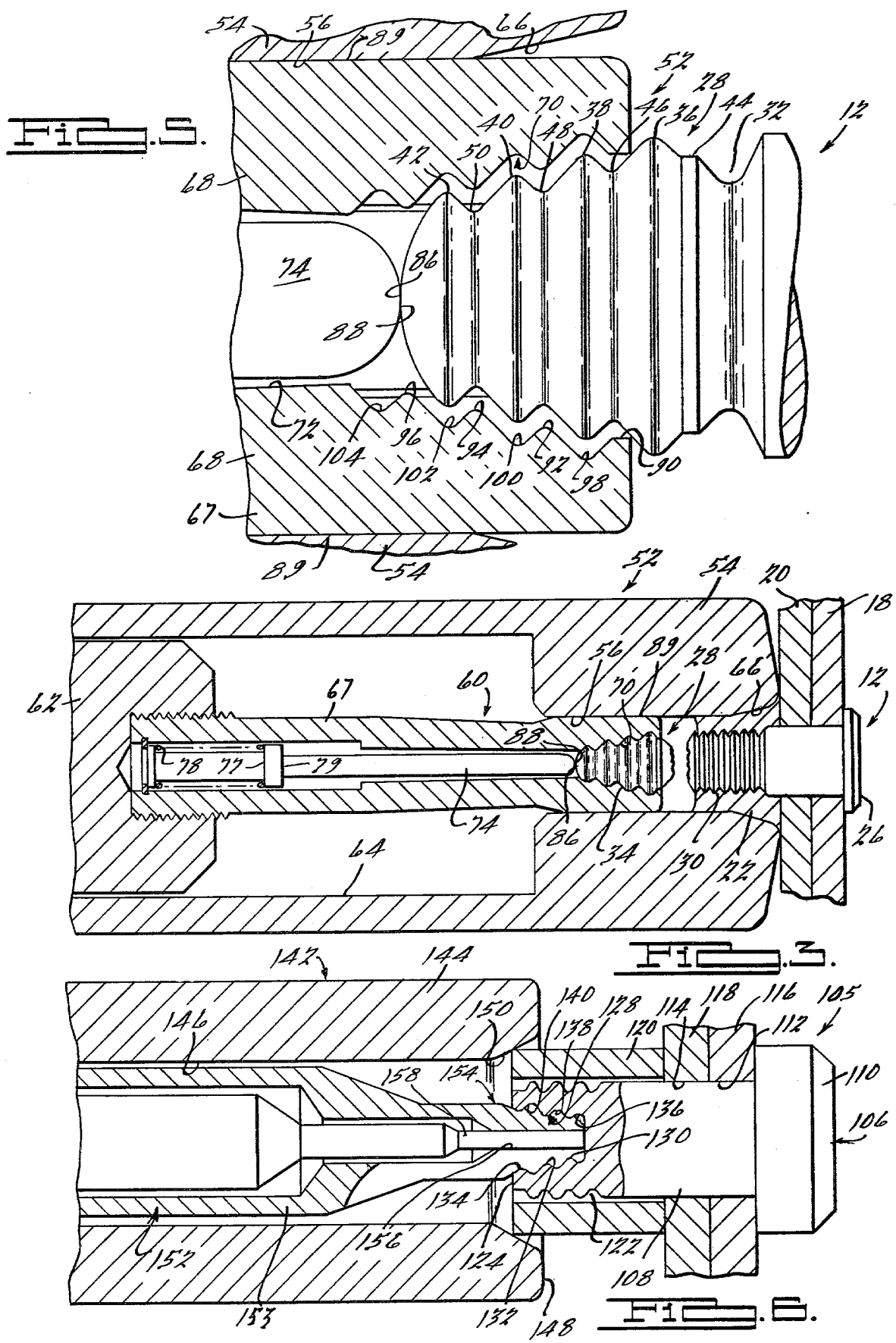

TWO PIECE FASTENER AND INSTALLATION TOOL

This is a continuation of application Ser. No. 2,582, filed Jan. 10, 1979, now abandoned.

BACKGROUND AND SUMMARY OF THE INVENTION

The present invention relates generally to multiple piece fasteners and more particularly to two piece fasteners of the type comprising a pin and swageable collar designed for installation by a pulling tool which exerts a pulling force on the pin and reaction force on the collar so as to swage the collar into engagement with the pin.

Conventional pull-type two piece fasteners include a pin and a collar adapted to be swaged thereon. The pin has an elongated shank provided with a head at one end, a plurality of lock grooves and a plurality of pull grooves defined by substantially uniform diameter crests alternating with valleys of substantially uniform diameter. These pull grooves are provided on a separable pintail portion of the shank. The collar is applied to the shank of the pin subsequent to insertion of the pin into a prepared opening in workpieces to be joined. An installation tool having a jaw assembly is applied to the pin with the jaws of the installation tool having a plurality of teeth adapted to engage a selected number of the pull grooves whereby a pulling force can be exerted on the pin. The installation tool also has a swaging anvil adapted to engage the collar and to swage the collar into engagement with locking grooves on the shank portion of the pin in reaction to the pulling force. As the pulling force continues to increase in magnitude the pintail portion of the shank is separated at a breakneck groove provided on the pin shank between the locking grooves and the pull grooves. The pintail portion is discarded and the setting operation is complete. This pintail portion, however, represents a cost factor in the fastener which contributes nothing to the fastened joint as it serves only to aid in the installation of the fastener.

Typically these pintail portions have been fabricated with a substantially greater number of pull grooves than that required to properly set the fastener. One of the reasons for this excess number of pull grooves and hence extra length of the pintail is to ensure that a sufficient number of pull grooves are engaged by the jaws of the installation tool to develop the pull force required to set the fastener. If an insufficient number of pull grooves are engaged by the jaws, the engaged pull grooves may be stripped before complete setting of the fastener thus requiring removal of the partially installed fastener and installation of a new fastener.

While present material costs attributable to this lengthy pintail when such pull-type fasteners are fabricated from low cost materials may not be significant enough to generate much concern, this is not necessarily the case when the fasteners are fabricated from more costly, exotic metals such as titanium which are commonly used in the aerospace industry. In the latter case, it is very desirable to reduce to an absolute minimum the amount of material required and hence the costs associated with the fastener and particularly to reduce the amount of that material and associated cost which does not contribute to the integrity or strength of the fastener as installed i.e. the disposable pintail. One problem, however, is to assure that the minimum number of grooves are engaged by the tool jaws to preclude stripping.

Accordingly, the present invention provides a fastener and associated installation tool jaw assembly by which the amount of disposable pintail material is minimized. In a preferred form of the invention, the pintail portion of the pin is reduced to a minimum length required to provide only that number of pull grooves necessary to provide sufficient strength to accept the setting force to be exerted thereon by the installation tool when all of the grooves are engaged. In a different form of the invention, the pintail portion is totally eliminated, the pull grooves being provided within an axially inwardly extending opening provided in the pin portion of the fastener. In both of these embodiments, the pull grooves are designed to cooperate with the jaws of the installation tool in such a manner as to preclude engagement of less than the minimum number of pull grooves required before any pulling force can be generated thereby eliminating the possibility of stripping of the grooves.

Thus, the present invention provides a pull-type fastener and associated installation tool jaw structure which enables the length of the pintail to be substantially reduced or even eliminated while still precluding the possibility of stripping the fastener. The reduced length or complete elimination of the pintail portion affords the advantage of cost savings which can be significant where costly materials are employed.

Additional advantages and features of the present invention will become apparent from the subsequent description and the appended claims taken in conjunction with the accompanying drawings.

BRIEF DESCRIPTION OF THE DRAWINGS

FIG. 3 is a view similar to that of FIG. 1 but showing the fastener in a set condition with the pintail portion separated therefrom;

FIG. 5 is a view similar to FIG. 4 but showing an improper relationship between the installation tool jaws and the pintail portion; and FIG. 6 is a view similar to that of FIG. 2 but illustrating a different form of the present invention.

DESCRIPTION OF THE PREFERRED EMBODIMENTS

Figure 1:
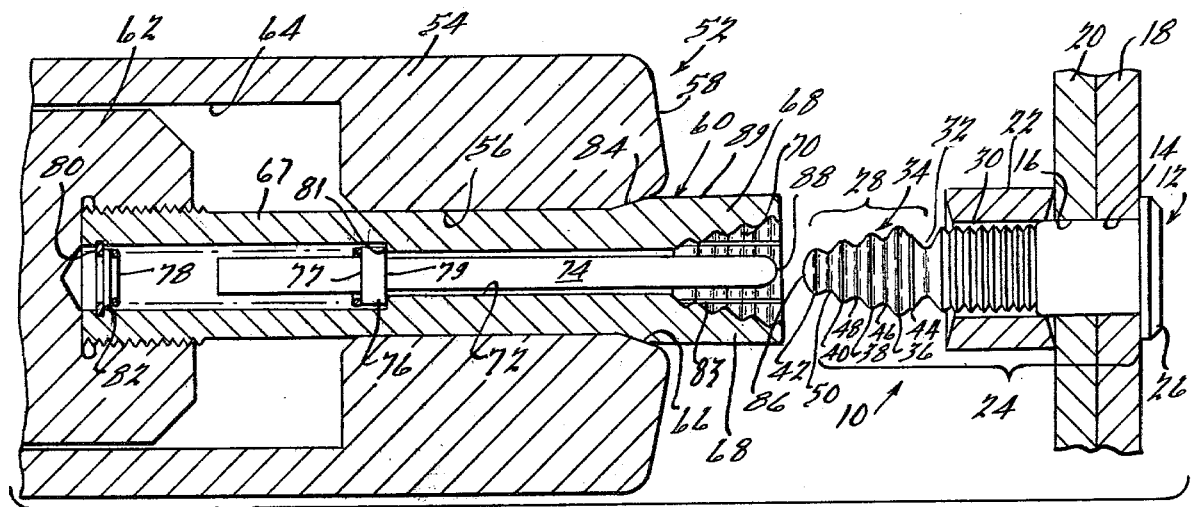
FIG. 1 is an elevational view of a fastener partially in section with the fastener assembled to workpieces to be joined and a portion of an installation tool ready for application thereto all in accordance with the present invention.
Figure 2:
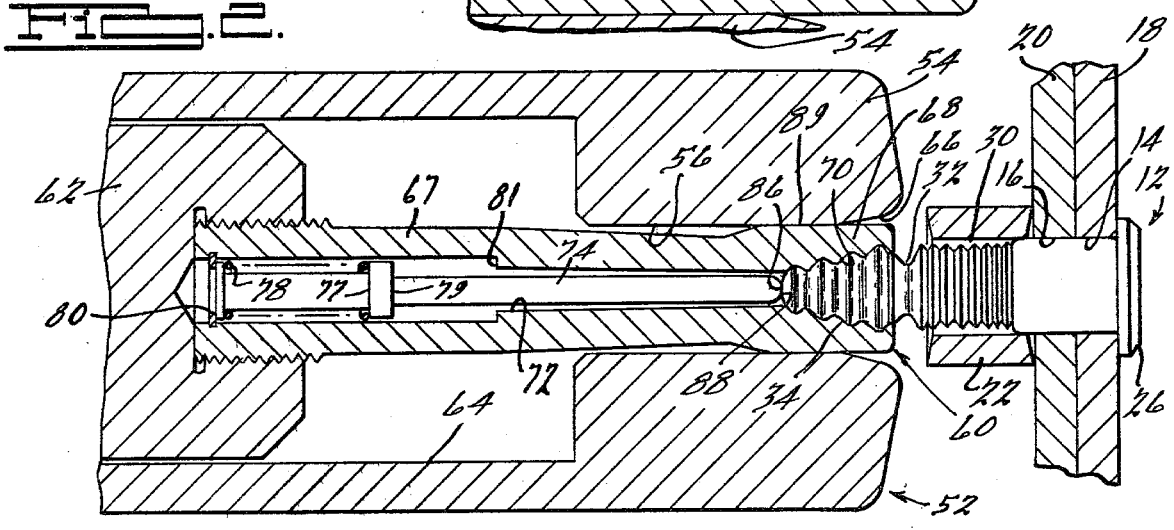
FIG. 2 is a view similar to FIG. 1 but showing the installation tool in initial engaging relationship with the fastener.

Referring now to the drawings and specifically to FIGS. 1 through 3, there is shown a pull-type two piece fastener in accordance with the present invention indicated generally at 10 and comprising a pin 12 installed within aligned openings 14 and 16 of workpieces 18 and 20 respectively and a swage collar 22 assembled thereto.

Pin 12 includes a shank portion 24 having a head 26 provided at one end thereof, a pintail portion 28 at the other end thereof and a plurality of locking grooves 30 disposed therebetween. A breakneck groove 32 is also provided on shank portion 24 between locking grooves 30 and pintail portion 28. It should be noted that head 26 of pin 12 may be of either a shear or tension type and further of either a protruding type as shown or of a countersunk type if desired. Also, locking grooves 30 may be of any suitable construction such as of the type illustrated and described in U.S. Pat. No. 3,915,053 issued Oct. 28, 1975 for example. Similarly, collar 22 may be of any suitable type desired.

Pintail portion 28 of pin 12 is of a generally conical shape and has a plurality of pull grooves 34 provided therealong, each of said pull grooves being defined by successively alternating crests 36 through 42 and valleys 44 through 50. As shown, each of the successive crests 36 through 42 proceeding outwardly away from breakneck groove 32 has a diameter less than any of the preceding crests. Similarly, each of the valleys 44 through 50 has a diameter less than the diameter of any of the preceding valleys.

A portion of an installation tool assembly 52 is also shown in FIGS. 1 through 3 and comprises an anvil 54 having a bore 56 extending inwardly from end 58 thereof through which a collet assembly 60 extends, collet assembly 60 normally extending outwardly beyond end 58. A collet assembly carrying member 62 is reciprocably disposed within an enlarged diameter bore 64 provided within anvil 54, into which bore 56 opens. The outer end of bore 56 has an outwardly flared generally frusto conically shaped surface portion 66 provided thereon.

Collet assembly 60 comprises a tubular collet jaw structure 67 terminating in a longitudinally split or segmented jaw portion 68 having a plurality of radially inwardly extending teeth 70; the jaw structure 67 has a longitudinally extending central bore 72 extending inwardly. The jaw portion 68 has three jaw segments normally resiliently located in an open position. Collet assembly 60 includes a spring loaded ejection pin or mandrel 74 which is movably disposed within bore 72 and which is urged outwardly between teeth 70 of jaw portion 68 by a spring 78. Ejection pin 74 has a flange portion 76 provided on its inner end, one surface 77 of which provides a seat for one end of the biasing spring 78, the opposite surface 79 of which engages an annular shoulder 81 provided within the jaw structure 67 so as to retain ejection pin 74 therein. The other end of spring 78 is seated on a retaining ring 80 seated within a groove 82 provided at the inner end of collet jaw structure 67.

Jaw portion 68, as previously mentioned, is comprised of a plurality of resilient fingers or sections which may be formed by providing a plurality of axially inwardly extending slits 83 which extend for only a portion of the length of collet jaw structure 67. Alternatively the fingers could be provided by fabricating collet jaw structure 67 from a plurality of separately machined segments. In any event, the outer surface of collet jaw portion 68 is provided with an inclined or frusto conical surface portion 84 which is engageable with surface 66 of anvil assembly 54. The actuation mechanism portion of installation tool 52 may be of any suitable conventional construction such as the type illustrated in U.s. Pat. No. 3,329,000, the disclosure of which is hereby incorporated by reference. As will be seen the tool 52 can be actuated by an operator to a pulling stroke during which the fastener 10 is set and then deactuated whereby the tool 52 will be activated to a return stroke.

As seen in FIG. 2, when installation tool 52 is applied to fastener 10, the terminal end surface 86 of pintail portion 28 will engage rounded end portion 88 of ejection pin 74 thereby moving ejection pin 74 longitudinally into bore 72 and compressing spring 78. Thereafter, the tool 52 is actuated to its pulling stroke causing collet carrying member 62 to move longitudinally relative to the anvil assembly 54. As jaw portion 68 moves longitudinally or axially inwardly with respect to anvil 54, the engagement of surface 66 with inclined surface 84 causes the separate fingers of collet jaw portion 68 to move radially inwardly and the teeth 70 to move into engaging relationship with pull grooves 34 of pintail portion 24. When jaw portion 68 is in a fully closed position, outer surface 89 engages the sidewall of bore 56 along its length axially outwardly from inclined surface 84 holding the fingers of jaw portion 68 closed as a pulling force is exerted on pin 12.

Thereafter, continued relative movement between the anvil 54 and collet carrying member 62 will cause surface 66 and a portion of bore 56 thereof to move into engagement with and swage collar 22 into engagement with locking grooves 30 of pin 12. Thereafter, increased pulling force is applied to pintail portion 24 until breakneck groove 32 fractures thereby separating pintail portion 28 from the set fastener. It should be noted that bore 56 will be of a sufficient length to insure full engagement with surface 89 over the entire length of travel of collet assembly 60. The installation tool 52 is then deactuated from its pulling stroke by the operator whereby the installation tool 52 is activated to its return stroke causing the collet assembly 60 to move axially outwardly relative to anvil assembly 54 to return tool 52 to its ready position as shown in FIG. 1. At the same time on the return stroke the swaging anvil 54 is retracted from the swaged collar 22. Jaw portions 68 will then move radially outward into an open position and separated pintail 28 will be ejected therefrom by outward movement of ejection pin 74. Installation tool 52 is then ready for application to the next fastener to be set.

Figure 4:
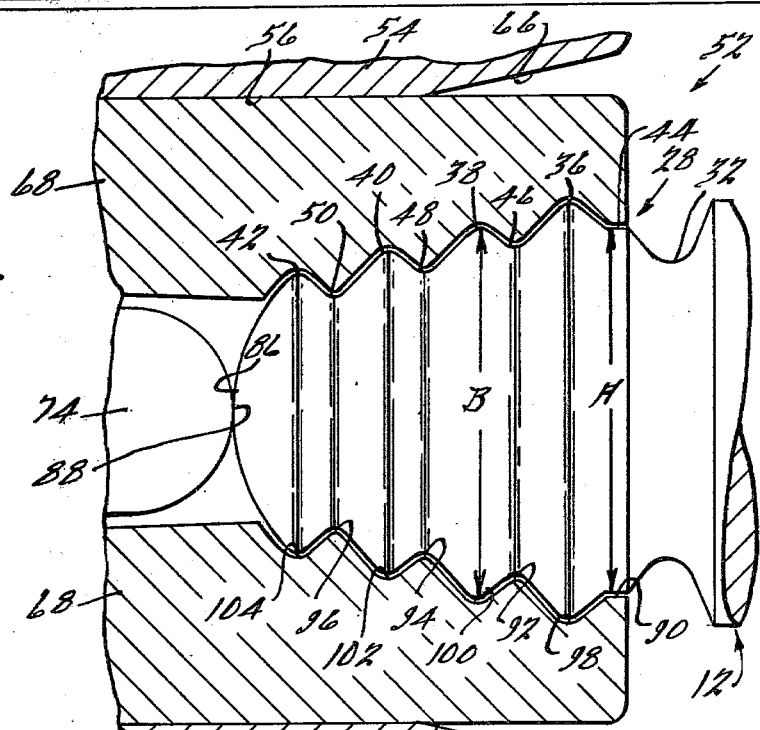
FIG. 4 is an enlarged fragmentary view shown partially in section of the pintail portion of the fastener of FIGS. 1 through 3 with the installation tool jaws shown in engaging relationship therewith.

As previously mentioned and best seen with reference to FIGS. 4 and 5, jaw teeth 70 are preferably contoured to complement crests 36 through 42 and alternating valleys 44 through 50 of pintail portion 28 and are defined by crests 90 through 96 and alternating valleys 98 through 104. The diameter "A" of pintail portion 28, as measured at valley 44, is substantially equal to or slightly greater than diameter "B" of pintail portion 28 as measured at crest 38. Similarly, the respective diameters of pintail portion 28 as measured at valleys 46 and 48 are approximately equal to or slightly greater than the diameters at crests 40 and 42, respectively. Similarly, as jaw teeth 70 of collet assembly 60 preferably have a shape complementary to the shape of pintail portion 28, the diameter of the opening defined by and measured at valley 100 will be less than or equal to the diameter of the opening defined by and measured at crest 90 thereof when jaw portions 68 are in a fully closed position. Similarly, the diameter of the respective openings defined by and measured at valleys 102 and 104 will be less than or approximately equal to the respective diameters of the openings defined by and measured at crests 92 and 94, respectively. Accordingly, proper and full application of installation tool 52 to pintail portion 28 will result in full mutual engagement of jaw teeth 70 with pull grooves 34. It is important to note that with this structure the diameter of jaw crest 90 in its closed position is greater than that of each of the pintail crests 38, 40, and 42. The same is true with jaw crest 92 relative to pintail crests 40 and 42 and with jaw crest 94 relative to pintail crest 42. Thus the jaw crests 90, 92, 94 and 96 will engage pintail crests 36, 38, 40 and 42 only when both sets of crests are in proper alignment thereby assuring gripping of all of the pintail crests by all of the jaw crests or gripping of none. Thus, should for some reason the operator fail to fully or completely apply installation tool 52 to pintail portion 28 prior to actuation of the tool so that jaw portion 68 closes before pintail portion is properly axially positioned, the tool will cycle without stripping the pull grooves 34. This situation can be seen in FIG. 5 where the results of improper alignment are shown. Thus, when jaw portion 68 is in a fully closed position, the opening defined by crest 90 will clear any of the axially outwardly disposed crests 38, 40, or 42 and the same is true with regard to jaw crest 92 as compared to pintail crests 40 and 42, and with regard to jaw crest 94 as compared to pintail crest 42. Thus, the present invention provides an effective disabling feature which allows the pintail length to be reduced to a minimum without concern as to stripping of the pull grooves should the tool be positioned thereon so as to provide less than full engagement of jaw teeth 70 with all of the pull grooves 34.

While the present invention has been illustrated and described with reference to a pin having a pintail portion provided with four pull grooves 34, the specific number is not critical. It is important, however, to provide a number of pull grooves, each having a shear area such that the sum total of shear areas of the pull grooves which will be engaged by the installation tool is capable of supporting the pulling force necessary to fully set the fastener. Note that in order to optimize material usage and minimize the amount of material required the effective total shear area is selected to be a preselected minimum magnitude. Ideally the minimum effective shear area would be that just sufficient to accept the maximum shear stress imposed by the maximum anticipated loads. This minimum shear area, however, is set greater than the ideal in order to accommodate variations in manufacturing, dimensional and material tolerances. With the above construction and by providing the minimum number of pull grooves having the minimum required total effective shear area, it is possible to reduce the length of the pintail portion 28 to a minimum; this can be a length generally equal to approximately the nominal diameter of the smooth shank portion of the pin 12.

It should also be noted that each of crests 36 through 42 of pintail portion 28, as well as each of the jaw crests 90 through 96 are sufficiently radiused at their peaks so as to assist the tool 52 to be cammed into or out of full engagement with all of the pull grooves 34 should tool 52 be actuated when, for example, pintail crest 36 and jaw crest 90 are positioned in radial alignment. This arrangement will reduce the possibility of jaw portions 68 being damaged or broken should crests 36 and 90 be so aligned upon actuation of tool 52.

Further, while the present invention is illustrated as including a pin 12 having a breakneck groove 32 provided thereon, in some applications it may be possible to eliminate this breakneck and to allow pintail portion to remain attached to pin member 12.

Note that the diameter of the bore 56 represents the final swage diameter of the collar 22. This, of course, limits the maximum diameter of the surface 89 of the jaw portion 68. At the same time the wall thickness of the jaw portion 68 will be limited by the contour of the teeth 70. By utilizing the generally conical shape for the pintail portion 34 and hence for the area of teeth 70 an increase in wall thickness in the jaw portion 68 across the valley 104 will provide an increase in strength as contrasted to that resulting if a uniform diameter pintail portion 34 and teeth 70 were provided. Thus an additional advantage of the conical shape lies in an increase in strength of the jaw portion 68.

While the present invention has been illustrated and described above with regard to a fastener having a minimum length pintail portion, it is possible in some cases to totally eliminate the pintail portion. To this end a different form of invention is illustrated and will be described with reference to FIG. 6. A fastener 105 is shown therein and comprises a pin 106 having a shank portion 108 with a head 110 provided on one end thereof. Pin 106 is shown installed within prepared openings 112 and 114 of workpieces 116 and 118, respectively, and has a swageable collar 120 assembled thereto. Shank portion 108 has a plurality of annular lock grooves 122 provided thereon adjacent end 124 into which collar 120 is swaged during setting of the fastener.

Pin 106 is provided with an opening extending axially inwardly from end 124 thereof, which opening has a plurality of pull grooves 128 provided therein which are defined by crests 130, 132 and 134 and alternating valleys 136, 138, and 140.

A pulling tool 142 comprises an anvil portion 144 having an axially extending bore 146 provided therein opening outwardly through end portion 148 and provided with a generally frusto conically shaped surface 150 immediately adjacent thereto. A collet assembly 152 includes a mandrel 153 movably disposed within bore 146 and has a forward expandable nose portion 154 having a multitoothed outer surface contoured to correspond to the contour of pull grooves 128 and engageable therewith. Nose portion 154 is comprised of a plurality of axially extending fingers or segments and has a bore 156 extending axially therethrough within which is disposed an expansion pin 158 which operates to cause the axially extending segments of nose portion 154 to move radially outwardly as it moves into bore 156.

Thus, in order to set fastener 105, nose portion 154 is inserted into the opening in end 124 of pin 106. At this time the fingers or segments of nose portion 154 can move radially inwardly permitting the noted insertion. Thereafter, the tool 142 is actuated and pin 158 is caused to move axially into bore 156 thereby causing the axially extending segments of nose portion 154 to be radially expanded into engagement with pull grooves 128 and thereby enable installation tool 142 to exert a pulling force on pin 106 and effect relative movement of anvil portion 144 so as to swage collar 120 into engagement with locking grooves 122.

It should be noted that the specific number of pull grooves provided within end portion 124 of pin 106 will be selected so as to ensure a sufficient total shear area thereof to withstand the forces necessary to set the fastener. In order to ensure that all of the crests 130–134 will be engaged by the corresponding teeth in nose portion 154, the relative diameters of alternating crests 130 through 134 and valleys 136 through 140 and the corresponding valleys and crests of nose portion 154 are controlled to incorporate the disabling go, no-go feature described above with reference to FIGS. 1 through 5 thereby described above with reference to FIGS. 1 through 5 thereby precluding the possibility of engagement of less than all of the pull grooves by the nose portion 154 of the installation tool and thereby reducing the likelihood of stripping.

Thus, the present invention provides a pull-type fastener which enables the length of the pintail to be substantially reduced to a minimum length just necessary to accept the pulling force necessary for installation of the fastener; in a different form of the invention the pintail is eliminated entirely. Reducing the length of the pintail affords significant cost savings particularly in fasteners fabricated from exotic metals such as titanium without any reduction of strength or ease of installation. Further, the pull grooves and associated jaw portions of the installation tools are designed so as to effectively reduce the likelihood of the pull grooves being stripped due to improper positioning of or premature actuation of the installation tool.

While it will be apparent that the preferred embodiments of the invention disclosed are well calculated to provide the advantages and features above stated, it will be appreciated that the invention is susceptible to modification, variation and change without departing from the proper scope or fair meaning of the subjoined claims.

What is claimed is:

1. In a system for securing a plurality of workpieces including a two piece pull-type fastener comprising a pin and a swageable collar, an installation tool having a collet assembly including a jaw portion having a plurality of teeth engageable with a plurality of pull grooves provided on said pin and an anvil engageable with said collar, said jaw portion being operative to exert a pulling force on said pin so as to cause said anvil to swage said collar into engagement with a plurality of locking grooves provided on said pin, improved means for enabling said installation tool to exert said pulling force on said pin so as to thereby set said fastener comprising at least a predetermined number of pull grooves provided on said pin, said plurality of teeth on said jaw portion being at least equal to said predetermined number of pull grooves, disabling means on said installation tool and said pin for preventing gripping engagement by said teeth of less than said predetermined number of pull grooves whereby stripping of any of said predetermined number of pull grooves by applying said pulling force through less than all of said predetermined number of pull grooves is inhibited.

2. A system as set forth in claim 1 wherein said pull grooves are disposed in a pintail portion of said pin.

3. A system as set forth in claim 2 further including a breakneck groove disposed between plurality of pull grooves and said lock grooves.

4. A system as set forth in claim 2 wherein said pintail portion has a length equal to approximately the nominal diameter of said pin.

5. A system as set forth in claim 1 wherein said plurality of pull grooves are defined by alternating crests and valleys, said crests and said teeth being sufficiently radiused at their peaks to provide a camming action should said installation tool be actuated to close said jaws when said teeth are in radial alignment with said crests.

6. A system as set forth in claim 1 wherein said plurality of pull grooves are disposed within an opening provided in one end of said pin member.

7. A system as set forth in claim 6 wherein said plurality of pull grooves are defined by alternating crests and valleys, said crests and said teeth being sufficiently radiused at their peaks to provide a camming action should said installation tool be actuated to close said jaws when said teeth are in radial alignment with said crests.

8. In a system for securing a plurality of workpieces including a two piece pull-type fastener comprising a pin and a swageable collar, said pin having a shank including a pintail portion and having an enlarged head, an installation tool having a collet assembly including a plurality of jaws each having a plurality of teeth engageable with a plurality of pull grooves provided on said pin and an anvil engageable with said collar, said jaw portion being operative to exert a pulling force on said pin so as to cause said anvil to swage said collar into engagement with a plurality of locking grooves provided on said pin, improved means for enabling said installation tool to exert said pulling force on said pin so as to thereby set said fastener comprising at least a predetermined number of pull grooves provided on said pin, said plurality of teeth on each of said jaws being at least equal to said predetermined number of pull grooves, said predetermined number of said pull grooves having a total effective shear area relative to said teeth to enable a pulling force of a preselected minimum magnitude, said minimum magnitude being greater by an amount compensating for variations in manufacturing, dimensional and material tolerances than that ideally necessary to set said fastener by said installation tool when said jaws engage at least said predetermined number of pull grooves, disabling means on said installation tool and said pin for preventing gripping engagement by said teeth of less than said predetermined number of pull grooves whereby stripping of any of said predetermined number of pull grooves by applying said pulling force through less than all of said predetermined number of pull grooves is inhibited.

9. A system as set forth in claim 8 wherein said jaws are actuable from an open to a closed position whereby said teeth grip said predetermined number of pull grooves in said closed position, said plurality of pull grooves are defined by alternating crests and valleys, each of said crests having a diameter less than the diameter of that one preceding it, said teeth being defined by alternating crests and valleys which, with said jaws in said closed position, are similar in shape to said crests and valleys of said plurality of pull grooves whereby said teeth can grip said predetermined number of pull grooves, when said jaws are in said closed position each of said crests of said teeth having a diameter sufficient to overengage one of said crests of said predetermined number of pull grooves and to clear each successive one thereafter so as to thereby prevent engagement of said teeth with less than all of said predetermined number of said pull grooves.

10. In a fastening system for joining a plurality of workpieces including a two piece pull-type fastener having a swageable collar and a pin including a shank and a head provided at one end of said shank portion, an installation tool having an anvil and a collet provided with jaws engageable with a plurality of pull grooves provided on a pintail portion disposed at another end of said shank whereby said installation tool is operative to exert a pulling force on said pin so as to enable said anvil to swage said collar into engagement with locking groove means provided on said shank portion between said pintail portion and said head, improved means for exerting said pulling force wherein said pintail portion is of a length approximately the nominal diameter of said shank portion and said plurality of pull grooves includes at least a predetermined number, each of said predetermined number of pull grooves having an effective shear area associated therewith, said predetermined number of said pull grooves having a total effective shear area to enable a pulling force of a preselected minimum magnitude with said magnitude being just greater than that ideally necessary to set said fastener by said installation tool when said jaws are engaged with said predetermined number of pull grooves, said magnitude including an amount compensating for predetermined variations between fasteners and said jaws whereby the length of said pintail portion is minimized.

11. A pull-type fastener for securing a plurality of workpieces together comprising: a pin having an elongated shank portion and a head provided at one end thereof; a plurality of lock grooves provided on said shank portion, said lock grooves being adapted to have a collar swaged into locking engagement therewith upon setting of said fastener; a plurality of pull grooves provided on said shank portion, said pull grooves being engageable by an installation tool for setting said fastener, by a pulling force applied through said pull grooves said pull grooves being defined by alternating crests and valleys, each of said crests having a diameter less than the diameter of the preceding one of said crests.

12. A fastener as set forth in claim 11 with said plurality of pull grooves having a total effective shear area to enable a pulling force of a preselected minimum magnitude with said magnitude being greater than that necessary to set said fastener.

13. A fastener as set forth in claim 12 wherein said pull grooves are disposed within an opening provided in the other end of said shank portion.

14. A pull-type fastener for securing a plurality of workpieces together comprising: a pin having an elongated shank and a head provided at one end thereof; said shank including a pintail portion at the opposite end, a plurality of lock grooves provided on said shank between said head and said pintail portion, said lock grooves being adapted to have a collar swaged into locking engagement therewith upon setting of said fastener; a plurality of pull grooves provided on said pintail portion, said pull grooves being engageable by an installation tool for setting said fastener by a pulling force applied through said pull grooves, said pull grooves being defined by alternating crests and valleys, each of said crests having a diameter less than the diameter of that one preceding it.

15. A fastener as set forth in claim 14 with said plurality of pull grooves having a total effective shear area to enable a pulling force of a preselected minimum magnitude with said magnitude being just greater than that ideally necessary to set said fastener with said magnitude including an amount compensating for predetermined variations between fasteners whereby the length of said pintail portion is minimized.

16. A fastener as set forth in claim 15 with said pintail portion having a length equal to approximately the nominal diameter of said pin.

17. A fastener as set forth in claim 15 wherein said pin further includes a breakneck groove disposed between said shank portion and said pintail portion, said installation tool being operative to separate said pintil portion from said shank portion upon completion of setting of said fastener.

18. In a system for securing a plurality of workpieces together by means of a two piece fastener including a pin having a shank with a head provided at one end, a swageable collar, an installation tool having an anvil and a collet assembly provided with a plurality of jaws engageable with a plurality of pull grooves provided on the shank whereby said installation tool exerts a pulling force on the pin so as to enable said anvil to move into engagement with said swage the collar into a plurality of lock grooves provided on the shank between the head and the pintail portion, the improvement comprising: said jaws of said installation tool having a plurality of teeth engageable with the plurality of lock grooves, said jaws being actuable from an open to a closed position and adapted to grip said pull grooves in one position and to release said pull grooves in the other position; said teeth being defined by alternating crests and valleys, each of said crests defining a diameter when said jaws are in said closed position less than the diameter defined by the preceding one of said crests.

19. The installation tool of claim 18 wherein said pull grooves have crests and valleys similar in shape to said crests and valleys of said teeth in said one position, each of said crests of said teeth having a diameter sufficient to overengage one of the crests of the pull grooves and to clear each successive one thereafter with said jaws in said one position.

20. The installation tool of claim 18 with said anvil having a central bore for swaging the collar onto the pin, said jaws being defined by a plurality of segments in guiding engagement with said central bore whereby said teeth of said jaws are moved into said one position.

21. The installation tool of claim 20 with said jaws having portions with said teeth extending beyond said central bore of said anvil when in said other position.

22. The installation tool of claim 21 with the pull grooves having crests and valleys similar in shape to said crests and valleys of said teeth in said one position, each of said crests of said teeth having a diameter sufficient to overengage one of the crests of the pull grooves and to clear each successive one thereafter with said jaws in said one position.

23. A system as set forth in claim 1 wherein said jaws are actuable from an open to a closed position whereby said teeth grip said predetermined number of pull grooves in said closed position, said plurality of pull grooves are defined by alternating crests and valleys, each of said crests having a diameter less than the diameter of that one preceding it, said teeth being defined by alternating crests and valleys which, with said jaws in said closed position, are similar in shape to said crests and valleys of said predetermined number of pull grooves whereby said teeth can grip said predetermined number of pull grooves, when said jaws are in said closed position each of said crests of said teeth having a diameter sufficient to overengage one of said crests of said predetermined number of pull grooves and to clear each successive one thereafter so as to thereby prevent engagement of said teeth with less than all of said predetermined number of said pull grooves.

24. A pull-type fastener for securing a plurality of workpieces together comprising: a pin having an elongated shank portion and a head provided at one end thereof; lock groove means provided on said shank portion, said lock groove means being adapted to have a collar swaged into locking engagement therewith upon setting of said fastener; a plurality of pull grooves provided on said shank portion, said pull grooves being engageable by an installation tool for setting said fastener, by a pulling force applied through said pull grooves, said pull grooves being defined by alternating crests and valleys, each of said crests having a diameter less than the diameter of the preceding one of said crests.

25. A fastener as set forth in claim 24 with said plurality of pull grooves having a total effective shear area to enable a pulling force of a preselected minimum magnitude with said magnitude being greater than that necessary to set said fastener.

26. In a system for securing a plurality of workpieces including a pull-type fastener comprising a pin having a shank including a pintail portion and having an enlarged head, an installation tool having a collet assembly including a plurality of jaws each having a plurality of teeth engageable with a plurality of pull grooves provided on said pin and an anvil engageable with collar means, said jaw portion being operative to exert a pulling force on said pin so as to set said fastener and to cause said anvil to move said collar means into engagement with lock groove means provided on said pin, improved means for enabling said installation tool to exert said pulling force on said pin so as to thereby set said fastener comprising at least a predetermined number of pull grooves provided on said pin, said plurality of teeth on each of said jaws being at least equal to said predetermined number of pull grooves, said predetermined number of said pull grooves having a total effective shear area relative to said teeth to enable a pulling force of a preselected minimum magnitude, said minimum magnitude being greater by an amount compensating for variations in manufacturing, dimensional and material tolerances than that ideally necessary to set said fastener by said installation tool when said jaws engage at least said predetermined number of pull grooves, disabling means on said installation tool and said pin for preventing gripping engagement by said teeth of less than said predetermined number of pull grooves whereby stripping of said predetermined number of pull grooves by applying said pulling force through less than all of said predetermined number of said pull grooves is inhibited.

27. A system as set forth in claim 26 wherein said jaws are actuable from an open to a closed position whereby said teeth grip said predetermined number of pull grooves in said closed position, said plurality of pull grooves are defined by alternating crests and valleys, each of said crests having a diameter less than the diameter of that one preceding it, said teeth being defined by alternating crests and valleys which, with said jaws in said closed position, are similar in shape to said crests and valleys of said predetermined number of pull grooves whereby said teeth can grip said predetermined number of pull grooves, when said jaws are in said closed position, each of said crests of said teeth having a diameter sufficient to overengage one of said crests of said predetermined number of pull grooves and to clear each successive one thereafter so as to thereby prevent engagement of said teeth with less than all of said predetermined number of said pull grooves.

28. A pull-type fastener for securing a plurality of workpieces together comprising: a pin having an elongated shank and a head provided at one end thereof; said shank including a pintail portion at the opposite end, lock groove means provided on said shank between said head and said pintail portion, said lock groove means being adapted to have a collar means moved into locking engagement therewith upon setting of said fastener; a plurality of pull grooves provided on said pintail portion, said pull grooves being engageable by an installation tool for setting said fastener by a pulling force applied through said pull grooves, said pull grooves being defined by alternating crests and valleys, each of said crests having a diameter less than the diameter of that one preceding it.

29. A fastener as set forth in claim 28 with said plurality of pull grooves having a total effective shear area to enable a pulling force of a preselected minimum magnitude with said magnitude being just greater than the ideally necessary to set said fastener with said magnitude including an amount compensating for predetermined variations between fasteners whereby the length of said pintail portion is minimized.

30. A fastener as set forth in claim 28 wherein said pin further includes a breakneck groove disposed between said shank portion and said pintail portion, said installation tool being operative to separate said pintail portion from said shank portion upon completion of setting of said fastener.

31. In a system for securing a plurality of workpieces together by means of a two piece fastener including a pin having a shank with a head provided at one end, collar means, an installation tool having an anvil and a collet assembly provided with a plurality of jaws engageable with a plurality of pull grooves provided on the shank whereby said installation tool exerts a pulling force on the pin so as to set said fastener including enabling said anvil to move into engagement with and swage said collar means into lock groove means provided on the shank between the head and the pintail portion, the improvement comprising: said jaws of said installation tool having a plurality of teeth engageable with the plurality of pull grooves, said jaws being actuable from an open to a closed position and adapted to grip said pull grooves in one position and to release said pull grooves in the other position, said teeth being defined by alternating crests and valleys, each of said crests defining a diameter when said jaws are in said closed position less than the diameter defined by the preceding one of said crests.

32. In a system for securing a plurality of workpieces including a pull-type fastener comprising a pin having an elongated shank portion and a head provided at one end thereof, locking groove means on said shank portion, collar means adapted to be swaged into said locking groove means upon setting of said fastener, an installation tool having a collet assembly including a jaw portion having a plurality of teeth engageable with a plurality of pull grooves provided on said shank portion and an anvil engageable with said collar means, said jaw portion being operative to exert a pulling force on said pin so as to set said fastener and to cause said anvil to swage said collar means into said locking groove means, improved means for enabling said installation tool to exert said pulling force on said pin so as to thereby set said fastener comprising at least a predetermined number of pull grooves provided on said pin, said plurality of teeth on said jaw portion being at least equal to said predetermined number of pull grooves, said predetermined number of pull grooves defining a shape substantially conforming to the shape of said plurality of teeth on said jaw portion when said jaw portion is in an engaging position, said substantially conforming shape of said predetermined number and said plurality of teeth cooperating to prevent gripping engagement by said teeth of less than said predetermined number of pull grooves whereby stripping of one or more of said predetermined number of pull grooves by applying said pulling force through less than all of said predetermined number of pull grooves is inhibited.

* * * * *

UNITED STATES PATENT AND TRADEMARK OFFICE
CERTIFICATE OF CORRECTION

PATENT NO. : 4,299,519
DATED : November 10, 1981
INVENTOR(S) : Robert J. Corbett It is certified that error appears in the above—identified patent and that said Letters Patent is hereby corrected as shown below:

Col. 3, line 63, "s." should be --S.--.

Col. 7, line 1, delete entire line.

Col. 7, line 2, delete "through".

Col. 7, line 53, (Claim 3), following "between" insert --said--.

Col. 10, line 9, (Claim 18), "said" should be --and--.

Col. 12, line 9, (Claim 29), "the" should be --that--.

Signed and Sealed this

Eighteenth Day of May 1982

|SEAL|

Attest:

GERALD J. MOSSINGHOFF

Attesting Officer

Commissioner of Patents and Trademarks